US012619262B2

(12) United States Patent
    Cui et al.

(10) Patent No.: US 12,619,262 B2
(45) Date of Patent: May 5, 2026

(54) METHODS AND SYSTEMS FOR REAL-TIME ENHANCED LEARNING SERVICES AND INTELLIGENT ON-DEMAND TASK-BASED SERVICES

(71) Applicant: AT&T Intellectual Property I, L.P., Atlanta, GA (US)

(72) Inventors: Zhi Cui, Sugar Hill, GA (US); Paul Edward Smith, Jr., Heath, TX (US); Venson Shaw, Kirkland, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 91 days.

(21) Appl. No.: 18/621,349

(22) Filed: Mar. 29, 2024

(65) Prior Publication Data

US 2025/0306608 A1      Oct. 2, 2025

(51) Int. Cl.
    *G05D 1/689*     (2024.01)
    *G05D 1/69*      (2024.01)
    *G05D 105/80*    (2024.01)
    *G05D 107/00*    (2024.01)
    *G16Y 20/10*     (2020.01)
    *G16Y 40/40*     (2020.01)

(52) U.S. Cl.
    CPC .............. *G05D 1/689* (2024.01); *G05D 1/69* (2024.01); *G05D 2105/80* (2024.01); *G05D 2107/95* (2024.01); *G16Y 20/10* (2020.01); *G16Y 40/40* (2020.01)

(58) Field of Classification Search
    CPC ...... G05D 1/689; G05D 1/6482; G05D 1/225;

G05D 1/69; A47L 11/4025; G06V 20/17; G06Q 10/20; F24F 11/54; B60W 40/08; G01S 7/006; B61L 23/04; B66D 1/605
See application file for complete search history.

(56) References Cited

U.S. PATENT DOCUMENTS

| | | | |
|---|---|---|---|
| 2016/0339277 A1* | 11/2016 | Angelopoulos | ........ B66D 1/605 |
| 2018/0074508 A1* | 3/2018 | Kleiner | ............... G05D 1/6482 |
| 2019/0161103 A1* | 5/2019 | Venkatasubramanian | .................... |
| | | | B61L 23/04 |
| 2020/0064444 A1* | 2/2020 | Regani | .................... G01S 7/006 |
| 2020/0223444 A1* | 7/2020 | Bonanni | ............... B60W 40/08 |
| 2020/0224915 A1* | 7/2020 | Nourbakhsh | ............ F24F 11/54 |
| 2021/0148878 A1* | 5/2021 | Kannan | .................... G06Q 10/20 |
| 2021/0304395 A1* | 9/2021 | Subramanian | ......... G06V 20/17 |
| 2022/0061621 A1* | 3/2022 | Weyant | .................. G05D 1/225 |
| 2022/0142422 A1* | 5/2022 | Giarritta | ............. A47L 11/4025 |

* cited by examiner

*Primary Examiner* — Yuri Kan
(74) *Attorney, Agent, or Firm* — Guntin & Gust, PLC; Miyoung Shin

(57) ABSTRACT

Aspects of the subject disclosure may include, for example, receiving a user selection relating to a course, transmitting a request to a controller in a vehicle for information regarding capabilities of available devices onboard the vehicle, wherein the available devices include uncrewed aerial vehicles (UAVs), based on the transmitting, obtaining, from the controller, the information regarding the capabilities, responsive to the obtaining, sending a command to the controller to facilitate deployment of one or more of the UAVs to collect data for the course, and after the sending, receiving the data from the controller and incorporating the data into the course for delivery to one or more users onboard the vehicle. Other embodiments are disclosed.

20 Claims, 9 Drawing Sheets

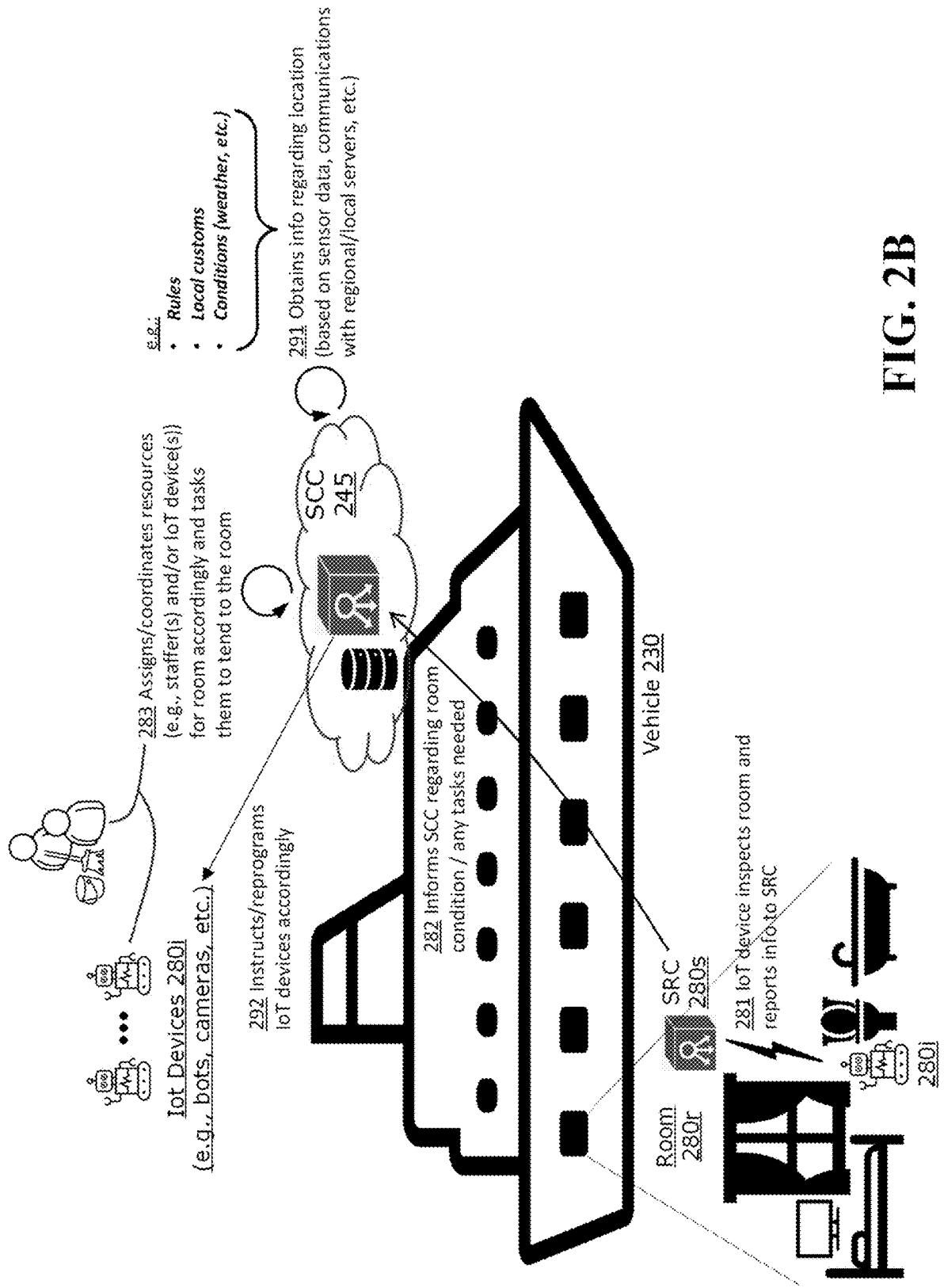

e.g.,
* Rules
* Local customs
* Conditions (weather, etc.)

291 Obtains info regarding location (based on sensor data, communications with regional/local servers, etc.)

283 Assigns/coordinates resources (e.g., staffer(s) and/or IoT device(s)) for room accordingly and tasks them to tend to the room

SCC 245

IoT Devices 280i
(e.g., bots, cameras, etc.)

292 Instructs/reprograms IoT devices accordingly

282 Informs SCC regarding room condition / any tasks needed

Vehicle 230

SRC 280s

281 IoT device inspects room and reports info to SRC

Room 280r

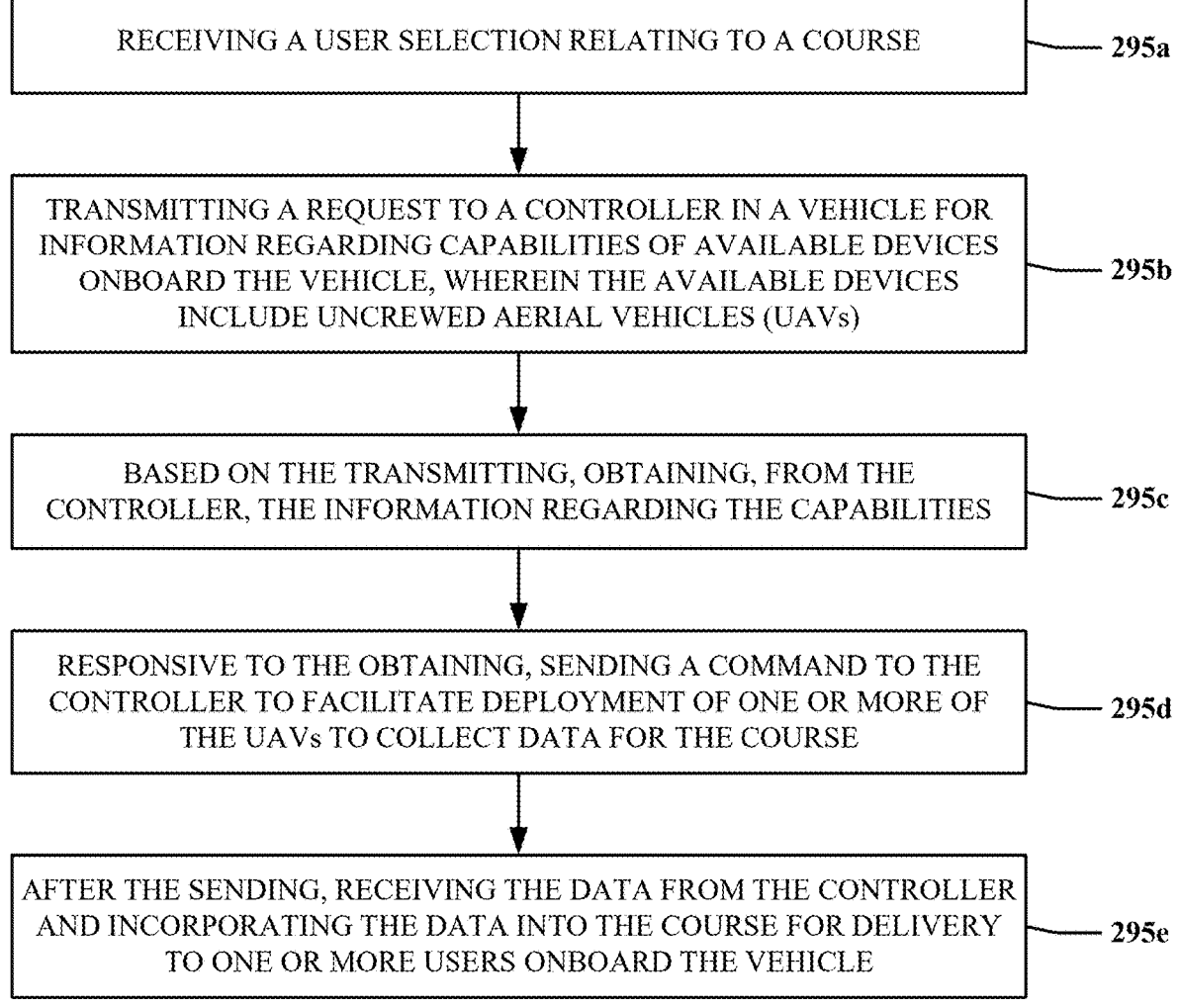

RECEIVING A USER SELECTION RELATING TO A COURSE — 295a

TRANSMITTING A REQUEST TO A CONTROLLER IN A VEHICLE FOR INFORMATION REGARDING CAPABILITIES OF AVAILABLE DEVICES ONBOARD THE VEHICLE, WHEREIN THE AVAILABLE DEVICES INCLUDE UNCREWED AERIAL VEHICLES (UAVs) — 295b

BASED ON THE TRANSMITTING, OBTAINING, FROM THE CONTROLLER, THE INFORMATION REGARDING THE CAPABILITIES — 295c

RESPONSIVE TO THE OBTAINING, SENDING A COMMAND TO THE CONTROLLER TO FACILITATE DEPLOYMENT OF ONE OR MORE OF THE UAVs TO COLLECT DATA FOR THE COURSE — 295d

AFTER THE SENDING, RECEIVING THE DATA FROM THE CONTROLLER AND INCORPORATING THE DATA INTO THE COURSE FOR DELIVERY TO ONE OR MORE USERS ONBOARD THE VEHICLE — 295e

METHODS AND SYSTEMS FOR REAL-TIME ENHANCED LEARNING SERVICES AND INTELLIGENT ON-DEMAND TASK-BASED SERVICES

FIELD OF THE DISCLOSURE

The subject disclosure relates to real-time (or near real-time) enhanced learning services and/or intelligent on-demand task-based services.

BACKGROUND

People generally spend time enjoying a variety of activities while on a voyage. A cruise ship, for instance, may offer numerous venues and entertainment options for passengers onboard to choose from. Throughout a journey, as passengers go about their activities, the facilities of the vessel, including passenger rooms and common areas, also undergo cleaning and maintenance.

BRIEF DESCRIPTION OF THE DRAWINGS

Reference will now be made to the accompanying drawings, which are not necessarily drawn to scale, and wherein:

FIG. 2B is a block diagram illustrating an example, non-limiting embodiment of another system functioning within, or operatively overlaid upon, the communications network of FIG. 1 and/or the system of FIG. 2A, in accordance with various aspects described herein.

FIG. 2C depicts an illustrative embodiment of a method in accordance with various aspects described herein.

DETAILED DESCRIPTION

Figure 1:
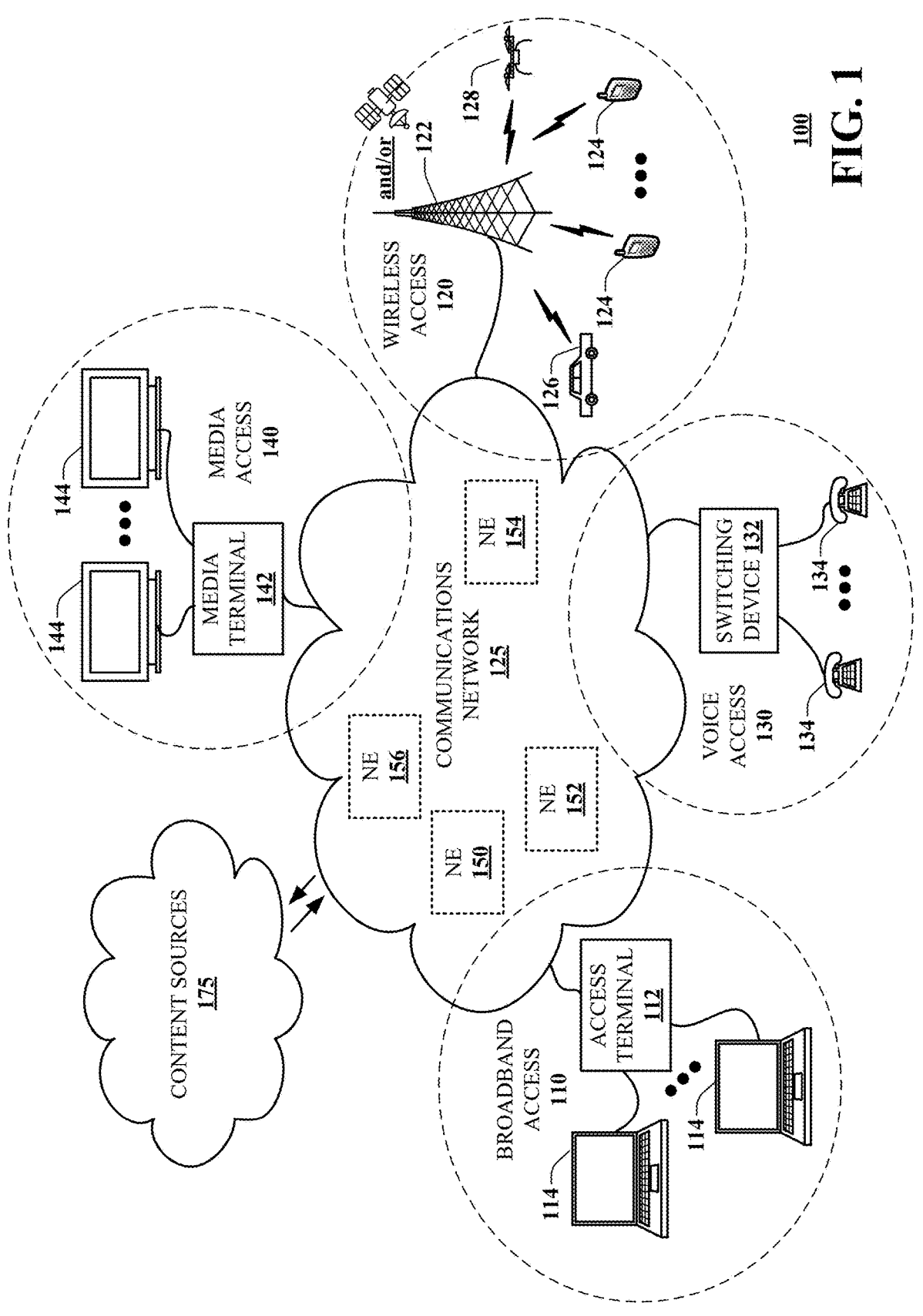
FIG. 1 is a block diagram illustrating an exemplary, non-limiting embodiment of a communications network in accordance with various aspects described herein.

It is believed that opportunities for passengers to learn subjects/topics while onboard a cruise are presently lacking. Further, maintenance/cleaning of rooms or common areas on a cruise ship is typically performed according to a fixed standard protocol, which can be inefficient and ineffective since the conditions of different rooms or areas may be different and thus demand different levels of care. Some or all of these issues can negatively impact guest experience and increase costs for the cruise ship operator.

The subject disclosure describes, among other things, illustrative embodiments of a learning system that is capable of providing enhanced, real-time (or near real-time) learning services. In exemplary embodiments, the system may be an on-demand study on the cruise (ODSC) system that provides such services to users onboard a vessel (e.g., passengers on a cruise) and/or elsewhere. In various embodiments, the ODSC system may facilitate course delivery to users (e.g., students or others interested in learning about a subject or topic) based on user request and/or requirements. In some embodiments, the ODSC system may communicate with cruise lines to identify capabilities, offers, requirements, etc. of corresponding cruise ships and/or equipment onboard. In one or more embodiments, the ODSC system may communicate with smart cruise controllers (SCCs) located onboard cruise ships. As will be described in more detail below, an SCC may facilitate procurement of content (e.g., videos, images, audio, etc.) for incorporation into a course or as part of modules of a course. Packaging and/or delivery of course content may be tailored to meet individual requests.

The subject disclosure also describes illustrative embodiments of a task-based system that is capable of providing (e.g., on-demand) maintenance/cleaning services. In exemplary embodiments, the task-based system may be implemented across an SCC, smart room controller(s) (SRCs), and Internet-of-Things (IoT) devices, such as, for instance, cleaning bots. In various embodiments, the task-based system may provide dynamic detection of room/area conditions and learn to optimize or improve the cleaning process. In some embodiments, cleaning bots may be equipped with sensors (e.g., cameras, etc.) for detecting the conditions of a given room, may provide information regarding the conditions to the task-based system, and may receive corresponding instructions from the task-based system to conduct/adapt the cleaning process. In one or more embodiments, the SCC may generally manage the cleaning bots and use data from the sensors to continually optimize or improve the cleaning process. In certain embodiments, the task-based system may be adaptive to the location or changing conditions. In these embodiments, the task-based system may adjust or reprogram maintenance/cleaning protocols of the cleaning bots based on different environments, regulations, rules, and/or customs. As an example, cruise ships often visit different ports of different countries, each with its own unique environmental conditions and regulations. The task-based system may control cleaning bots to adapt the room décor according to conditions/rules/customs associated with the current location. This advantageously allows for adjustable "personalities" for the rooms and transformable user experiences.

It will be understood and appreciated that, while various aspects of the learning system and the task-based system are described herein as pertaining to a cruise ship environment, any of these systems may be implemented for other types of vehicles, such as spaceships, planes, trains, buses, etc. and/or other environments, such as hotels, motels, or other types of lodgings.

Exemplary embodiments of the on-demand task-based service model may be provided by way of a communication network that communicatively couples the SCC, SRCs, and IoT devices. The communication network may be implemented using any suitable technology, such as Wi-Fi, Bluetooth, 5G, 6G, a higher generation network technology, etc. Enhancing the communication network using a 6G mosaic and ubiquitous connectivity, for instance, can provide for faster and more reliable communications between the controllers and bots. Specifically, 6G technology has the potential to enhance the performance, coverage, analytics, and advanced robotics capabilities of the on-demand task-based service model, providing an even more optimized or improved and efficient process and a better overall experience for guests on a cruise. RATs, such as 5G, 6G, and beyond, advantageously provide for high-speed, low-latency connectivity, enabling advanced monitoring and analysis of not only the cleaning process, but also other enhanced services and amenities that can be offered to guests, such as room service, lighting and temperature control, etc. Further, Open Radio Access Network (O-RAN) may be leveraged to help ensure that the communication network is reliable, resilient, and efficient, even in challenging conditions such as those found on a cruise ship.

Integrating advanced RAT(s) in the on-demand task-based service model provides for more efficient, effective, and enjoyable experiences for guests and improved profitability and sustainability for cruise operators. Instead of performing a universal or standard procedure for every room, the cleaning bots can be dynamically adapted to the condition of each room. The central controller and cleaning bots can work together to optimize or improve the cleaning process, reducing the time and resources required to clean each room, thereby increasing overall efficiency. Adapting the cleaning process and/or services offered to guests based on locality, environmental changes, and user preferences can also ensure that appropriate adjustments (e.g., to temperature/lighting/décor) are made as well as compliance with any relevant rules or regulations at the current port, allowing for customized guest experiences.

One or more aspects of the subject disclosure include a device, comprising a processing system including a processor, and a memory that stores executable instructions that, when executed by the processing system, facilitate performance of operations. The operations can include receiving a user selection relating to a course. Further, the operations can include transmitting a request to a controller in a vehicle for information regarding capabilities of available devices onboard the vehicle, wherein the available devices include uncrewed aerial vehicles (UAVs). Further, the operations can include based on the transmitting, obtaining, from the controller, the information regarding the capabilities. Further, the operations can include responsive to the obtaining, sending a command to the controller to facilitate deployment of one or more of the UAVs to collect data for the course. Further, the operations can include after the sending, receiving the data from the controller and incorporating the data into the course for delivery to one or more users onboard the vehicle.

One or more aspects of the subject disclosure include a non-transitory machine-readable medium, comprising executable instructions that, when executed by a processing system of a vehicle including a processor, facilitate performance of operations. The operations can include receiving, from a learning system, a request for information regarding capabilities of available devices onboard the vehicle, wherein the request relates to a course, and wherein the available devices include uncrewed aerial vehicles (UAVs). Further, the operations can include based on the request, transmitting the information regarding the capabilities to the learning system. Further, the operations can include responsive to the transmitting, receiving, from the learning system, a command to facilitate deployment of one or more of the UAVs to collect data for the course. Further, the operations can include based on the command, causing the one or more UAVs to be deployed to collect the data for the course.

One or more aspects of the subject disclosure include a method. The method can comprise obtaining, by a processing system of an Internet-of-Things (IoT) device including a processor, information regarding one or more conditions of a room or area of a vehicle. Further, the method can include providing, by the processing system, the information to a controller for analysis, wherein the providing enables the controller to determine one or more tasks that are needed to address the one or more conditions of the room or area, and to assign the IoT device or one or more other IoT devices to perform the one or more tasks for the room or area.

Other embodiments are described in the subject disclosure.

Referring now to FIG. 1, a block diagram is shown illustrating an example, non-limiting embodiment of a system 100 in accordance with various aspects described herein. For example, system 100 can facilitate, in whole or in part, real-time (or near real-time) enhanced learning services and/or intelligent on-demand task-based services. In particular, a communications network 125 is presented for providing broadband access 110 to a plurality of data terminals 114 via access terminal 112, wireless access 120 to a plurality of mobile devices 124, vehicle 126, and uncrewed aerial vehicle (UAV) 128 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal (e.g., a satellite system or the like). In exemplary embodiments, the base station or access point 122 may be located on a vehicle (e.g., a cruise ship, a train, a bus, etc.), and may be communicatively coupled to a satellite system to obtain network (e.g., Internet) connectivity for devices 124, 128, etc. onboard the vehicle. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
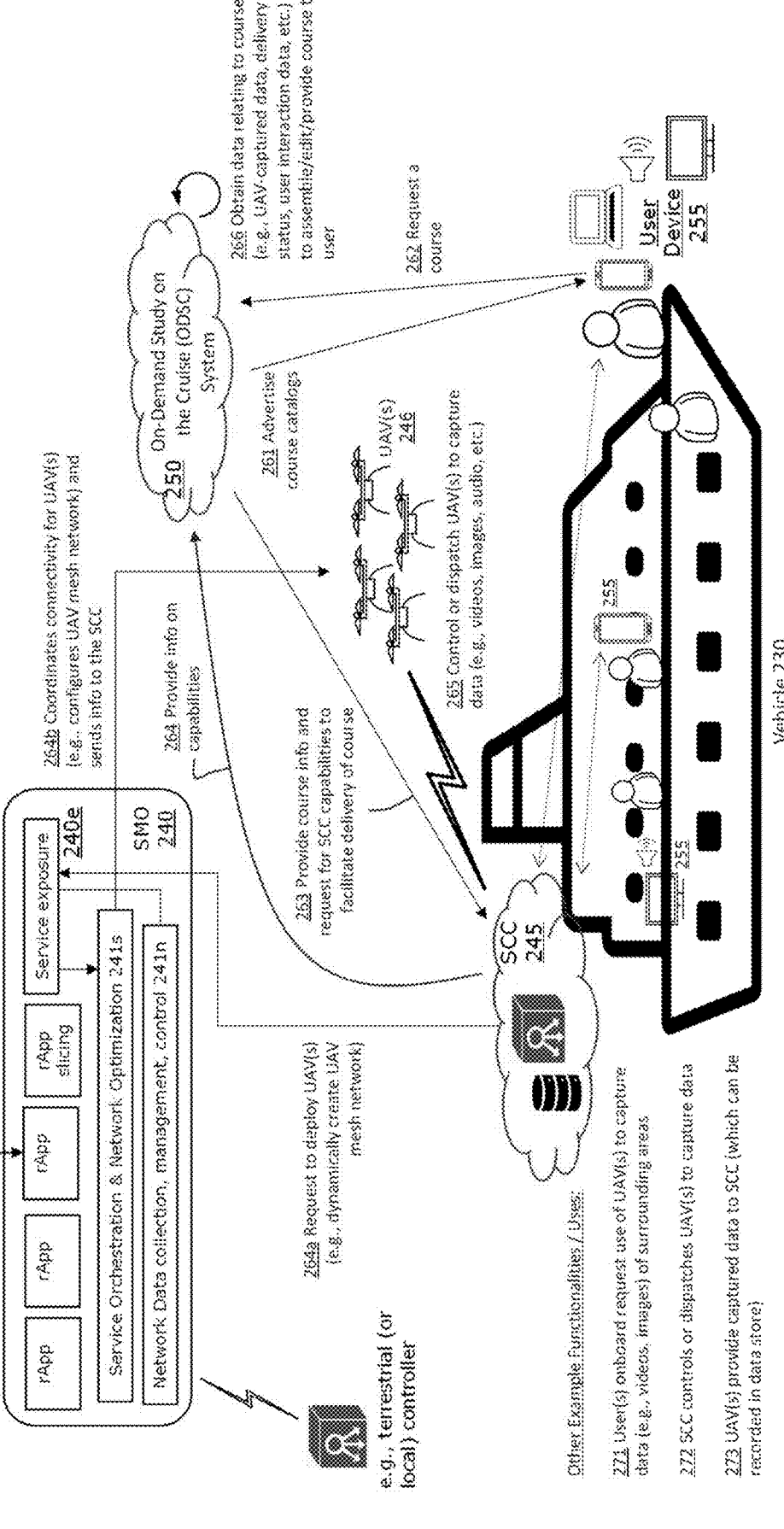
FIG. 2A is a block diagram illustrating an example, non-limiting embodiment of a system functioning within, or operatively overlaid upon, the communications network of FIG. 1 in accordance with various aspects described herein.

FIG. 2A is a block diagram illustrating an example, non-limiting embodiment of a network architecture of a system functioning within, or operatively overlaid upon, the communications network 100 of FIG. 1 in accordance with various aspects described herein. As shown in FIG. 2A, the network system may be related to a vehicle 230, and may include a service management and orchestration system (SMO) 240, an ODSC system 250, an SCC 245, UAV(s) 246, and user device(s) 255. Although not shown, one or more networks may be present to facilitate communications between the various systems/devices. For instance, the user device(s) 255 and/or the UAV(s) 246 may be communicatively coupled to the SCC 245 by way of an access network (e.g., wireless radio access network(s) (RAN(s)), Wi-Fi network(s), and/or wireline network(s)). As another example, the SCC 245 may be communicatively coupled to the SMO 240 by way of a satellite network. As yet another example, the SMO 240 may be communicatively coupled to the ODSC system 250 by way of a core network.

The ODSC system 250 may be implemented in one or more computing devices/servers that are configured to create, store, edit, and/or manage data relating to courses or topics of interest. In various embodiments, the ODSC system 250 may provide an open learning module platform (OLMP) configured to structure system components and/or content modules as plug-and-play elements that can be selectively combined to form a course. Different system components and/or content modules may be accessible via application programming interfaces (APIs) to allow for selective integration to form a customized course or customized delivery of a course. In some embodiments, the ODSC system 250 may be associated with or included in a particular institution's electronic learning system.

The SCC 245 may be implemented in one or more computing devices/servers that are configured to interact with the SMO 240, the ODSC system 250, user device(s) 255, and/or UAV(s) 246 to facilitate various actions relating to courses or topics, including, for instance, delivery of course-related data to end users, creation/storage/editing of data for inclusion in courses, and so on.

The access network may include network resources, such as one or more physical resources (or network nodes) and/or one or more logical resources. The physical resources may include base station(s), such as one or more gNodeBs (gNBs) or the like. A base station may employ any suitable RAT, such as 5G, 6G, or any higher generation RAT. The logical resources may include a voice service system (e.g., a hardware and/or software implementation of voice-related functions), a video service system (e.g., a hardware and/or software implementation of video-related functions, such as coder-decoder or compression-decompression (CODEC) components or the like), a security service system (e.g., a hardware and/or software implementation of security-related functions), and/or the like. In some embodiments, the access network may be in communication with a core network via intermediate links, such as those provided by a terrestrial transport system and/or a satellite-based transport system/network (not shown). The access network may include various quantities of cells (e.g., primary cells and/or secondary cells), various quantities of base stations in a cell, and/or various types of base stations and/or cells. User device(s) 255 can be located within cell coverage areas, provided by cells associated with the base stations, and may travel amongst various ones of the cells.

The core network may include various network devices and/or systems that provide a variety of functions. Examples of functions provided by, or included, in the core network include an access mobility and management function (AMF) configured to facilitate mobility management in a control plane of the network system 200, a User Plane Function (UPF) configured to provide access to a data network (such as a packet data network (PDN) in a user (or data) plane of the network system), a Unified Data Management (UDM) function, a Session Management Function (SMF), a Policy Control Function (PCF), and/or the like. In one or more embodiments, the core network may include a 5G core (5GC) (associated with an SMF), a 6G core (6GC) (associated with a control plane function (CPF)), and/or a Broadband Network Gateway (BNG). In various embodiments, the core network may include one or more devices implementing other functions, such as a master user database server device for network access management, a PDN gateway server device for facilitating access to a PDN, and/or the like. The core network may be in further communication with one or more other networks (e.g., one or more content delivery networks (CDNs)), one or more services, and/or one or more devices. In one or more embodiments, the core network may be implemented in distributed cores.

User device(s) 255 may include mobile devices 124 (e.g., personal devices), video display/audio output devices (e.g., presentation devices stationed onboard the vehicle 230 in select areas), IoT devices, and so on. A user device 255 may be equipped with one or more transmitter (Tx) devices and/or one or more receiver (Rx) devices configured to communicate with and utilize network resources.

UAV(s) 246 may include any (e.g., manually controllable or autonomous) personal or commercial aerial vehicle or device that is equipped with one or more types of devices or components for performing various actions. In certain embodiments, a UAV 246 may include one or more radio equipment configured to function as a cellular relay (e.g., low-powered cellular radio access (or small cell) node(s)), one or more sensors (e.g., image sensor(s), infrared sensor(s), near infrared camera(s), radar system(s), light detection and ranging (LIDAR) system(s), biological sensor (s), temperature sensor(s), chemical sensor(s), humidity sensor(s), audio sensor(s), and/or the like) for capturing information/data in an environment of the UAV, one or more mechanical limbs for physically manipulating external objects, and/or the like. In some embodiments, one or more UAVs may be deployed (e.g., positioned at particular locations) to provide network connectivity for user device(s) 255. In certain embodiments, a UAV may provide network connectivity by way of wireless "tethering" to (e.g., a base station or the like of) the access network. A UAV may additionally, or alternatively, communicate data (e.g., control data, user data, etc.) via the wireless tethering or wired link.

The SMO 240 may be configured to manage and orchestrate network services for efficient and/or optimal performance and resource utilization. In various embodiments, the SMO 240 may include service orchestration and network optimization functionality 241s, which may facilitate configuration, coordination, and/or management of network services in accordance with service requirements, service provisioning, scaling, and/or decommissioning, load balancing, Quality of Service (QoS) management, and/or routing optimization. In one or more embodiments, the SMO 240 may include network data collection, management, control functionality 241n, which may facilitate collection of data from various network elements and devices (e.g., that inform on network performance, resource utilization patterns, etc.), configuration management, policy enforcement, and/or fault detection. Data collection may involve communications with the SCC 245, elements in the access network, elements in the core network, etc. In certain embodiments, the SMO 240 may include one or more rApps (including those capable of facilitating network slicing) that are configured to facilitate usage of network resources based on network conditions. In exemplary embodiments, one or more functionalities in the SMO 240 may be capable of obtaining data regarding (e.g., the availability and the load conditions of) the resources in the access network, the core network, and/or one or more other intermediate networks. As shown in FIG. 2A, the SMO 240 may include service exposure functionality 240e that coordinates service instantiation and service/network resource chaining to meet the needs of various user-requested services.

In one or more embodiments, the SMO 240 may allow the network system to separate control plane operations from data plane operations, and may enable layer abstraction for separating service and network functions or elements from physical network functions or elements. In various embodiments, the SMO 240 may be communicatively coupled with the ODSC system 250, the SCC 245, and/or one or more other systems for receiving service requests.

In exemplary embodiments, the SMO 240 may be capable of performing service design and orchestration based on received service requests. The SMO 240 may analyze a service request to determine functions and/or network data flows that are needed to facilitate delivery of the requested service. In various embodiments, the SMO 240 may select/ define a directed graph and/or an associated model that identifies features of the requested service. The SMO 240 may generate service model(s) for the requested service in a programming language or format, such as Extensible Markup Language (XML), Yang models, other types of files, combinations thereof, or the like.

In one or more embodiments, the SMO 240 may effect service creation/selection and composition of resources to satisfy the needs of a requested service. In certain embodiments, the SMO 240 may design the chain of resources based on those needs. In this way, the SMO 240 may, based on requested service requirements, design and orchestrate service delivery for end consumers using the most cost-effective resources across the access network, the core network, and any intermediate networks. In some embodiments, the SMO 240 may also determine, and use, information regarding associated user priorities, extant network resource loadings, and/or the like to compose a requested service. In various embodiments, the SMO 240 may dynamically alter chains based on detected changes (or trigger conditions), such as a change in a physical location of a user device 255, a UAV 246, a change to interface equipment, and so on.

In this way, the SMO 240 may coordinate with various network elements to ascertain the availability, status, and/or requirements of the portfolios of resources in the underlying networks, and effect dynamic, intelligent composition of service functions and associated interfaces (by instantiating routes across the access network, the core network, and/or any intermediate networks) to derive a service instance for a requested service.

Referring now to an example flow of smart learning on the cruise ship 230 shown in FIG. 2A, at 261, the ODSC system 250 may advertise its course offerings. The courses may be included in a catalog of courses, and may pertain to a variety of subjects, including but not limited to geography, literature, mathematics, health sciences, art, engineering, environmental science, etc. At 262, a user device 255 may submit a request for a course or topic. For instance, a user may access the ODSC system 250 via a user interface (UI) presented on the user device 255, and may submit the request using the UI. The UI may obtain the courses advertised by the ODSC system 250, and may present a listing of the courses to the user for review/selection. In various embodiments, the UI may enable the user to identify requirements relating to the course and/or delivery of the course. As some examples, the UI may enable the user to choose to consume a comprehensive version of a course or an abridged version of a course (if available), video quality settings relating to delivery of a course, audio quality settings relating to delivery of a course, etc.

At 263, the ODSC system 250 may provide course/topic information to the SCC 245 and request for capability information for facilitating delivery of a course. For instance, the ODSC system 250 may inform the SCC 245 regarding a selected course and request the SCC 245 for information regarding its network-related capabilities (e.g., capability to coordinate with SMO 240, capability to broadcast data wirelessly to one or more devices, and/or the like), presentation capabilities of devices onboard the vehicle 230 (e.g., capabilities of video/audio output devices, including, for instance, their processing speeds, memory capacities, and whether users can interact with those devices, such as by way of touch screen input, voice input, gestures, etc.), UAV availability and capabilities (e.g., the quantity of UAVs available for dispatch, flight-related capabilities of the UAVs, data capturing capabilities of the UAVs, etc.), and so on. In some embodiments, the ODSC system 250 may preliminarily connect with the SCC 245 of the vehicle 230 as well as with other SCCs of other vehicles to obtain capability data and/or to determine if there are any locally-stored courses/offerings at the individual vehicles. In these embodiments, the ODSC system 250 may store some or all of this information for later use.

At 264, the SCC 245 may provide information regarding its capabilities and/or capabilities of systems onboard the vehicle 230. At 264a, the SCC 245 may submit a request to the SMO 240 to deploy UAV(s) 246 and, at 264b, the SMO 240 may coordinate connectivity for the UAV(s) 246. For instance, in a case where the ODSC system 250 provides information regarding a geography or environmental science course with content that relates to a mountainous area that is determined by the SCC 245 to be nearby (or within a threshold distance) from the vehicle 230, the SCC 245 may determine to deploy UAV(s) 246 to capture video/audio data at the mountainous area. In this case, the SCC 245 may submit the request to the SMO 240 to facilitate network connectivity for the UAV(s) 246. The request may include the number of UAV(s) 246 to deploy, the destination to which the deployed UAV(s) 246 are to travel, the duration of the flight, the type of data (e.g., video, image, audio) that are to be captured by the UAV(s) 246, and so on. The SMO 240 may, based upon the request, coordinate creation of network slices or stitching of network resources to provide the connectivity, coordinate creation of a mesh network between the deployed UAV(s) 246 (e.g., including by assigning Internet Protocol (IP) addresses to the UAV(s) 246, etc.), coordinate any relative positioning between the deployed UAV(s) 246 spanning from the vehicle 230 to the mountainous area for purposes of relaying network connectivity from one UAV to the next so as to maintain the connection between them, and/or the like. In some embodiments, the SMO 240 may control dispatching, flight management, data collection, etc. of the UAV(s) 246, and may forwarded captured data to the SCC 245. In certain embodiments, the SCC 245 may additionally, or alternatively, facilitate control of UAV dispatch, flight management, data collection, etc. (step 265). In any case, data collection may be controlled based on the aforementioned course information, any instructions by the ODSC system 250, user requests/interactions, or a combination thereof.

At 266, the ODSC system 250 may obtain the captured data and assemble, edit, and/or provide the course. For instance, the SCC 245 and/or the SMO 240 may provide the UAV captured data (e.g., in the form of hypermedia) to the ODSC system 250, which the ODSC system 250 may include as additional data in the existing course content. The ODSC system 250 may provide the assembled course to the user device 255 or to the SCC 245 for presentation (e.g., via video/audio output devices 255). In certain embodiments, the SCC 245 may alternatively perform the course content updating/assembly and present the modified course content to the user. In these embodiments, the SCC 245 may provide the modified course content to the ODSC system 250 for storage or presentation to other users elsewhere. In any case, updating/assembling a course may involve preparing individual modules of the course, creating different versions of the course (comprehensive, abridged, etc.), creating different levels of the course (e.g., beginner, intermediate, advanced), creating quizzes or exams for the course, and/or the like. Creating the course in this manner allows users to receive a customized version of the course as desired. In this way, a guest may experience real-time and dynamic learning while on a cruise.

In various embodiments, the ODSC system 250 may expand a given course based on UAV-captured data, user interactions/inputs, etc., and may even create new courses based on such collected data. User interactions/inputs can include user questions, user comments, user-to-user chats or conversations, and/or the like. In cases where users have specialized experience or knowledge in a topic, these users may, by way of their user interactions/inputs, add valuable and useful content to the course. In some embodiments, the ODSC system 250 may leverage generative artificial intelligence (AI) model(s) to generate additional content for a given course and merge this content with the UAV-captured data, user interactions/inputs, etc. to further expand the course. In one or more embodiments, the ODSC system 250 may also offer courses (e.g., on-demand) to individuals or groups of users, whether they are onboard the vehicle 230 or elsewhere (e.g., at home, at school, etc.). It will be understood and appreciated that a given course can be expanded upon and/or refined with more and more knowledge over time as more users (e.g., on a cruise or elsewhere) contribute to the course content.

It is to be appreciated and understood that some or all of the functions described as being performed by a particular device or component of the network system shown in FIG. 2A may additionally, or alternatively, be performed by one or more other devices or components of the network system. For instance, some or all of the functions described as being performed by the SCC 245 may additionally, or alternatively, be performed by the SMO 240, the access network, the core network, etc. As another example, some or all of the functions described as being performed by the ODSC system 250 may additionally, or alternatively, be performed by the SMO 240, the SCC 245, the access network, the core network, etc. Further, as described above, the SMO 240 may be capable of dynamically altering chains based on detected changes (or trigger conditions). In certain embodiments, the SMO 240 may, subsequent to designing and chaining resources for a given user device 255, monitor the user device 255's location (e.g., based on global positioning system (GPS) data, based on data provided by base station(s), and/or the like), and perform additional actions relating to the chaining. For instance, in one or more embodiments, the SMO 240 may, based upon detecting that the user device 255 is relocating from an indoor location with high-capacity Wi-Fi network coverage to an outdoor location with a weaker wireless coverage, perform one or more actions, such as causing a message to be transmitted to and presented on the user device 255 to notify the user of expected performance issues, re-assessing the available network resources to identify any changes that can be made (e.g., selection of a different access network resource, transport network resource, or core network resource, instantiation of a network slice, dispatch of a UAV to provide strengthened wireless coverage for the user device 255, etc.), and/or the like.

In various embodiments, the SCC 245 and/or the SMO 240 may dispatch UAV(s) 246 off-board to surrounding areas to facilitate provision of enhanced viewing experiences for guests. In these embodiments, the SCC 245 and/or the SMO 240 may dispatch the UAV(s) 246 automatically (e.g., based upon a detection that the vehicle 230 is within a threshold distance from a landmark or other point of interest) according to a cruise-controlled model and/or based on a user request or an end user-controlled model. As an example, the cruise-controlled model may involve UAV(s) 246 being deployed to dynamically capture images, videos, audio, etc., for real-time (or near real-time) presentation by video/audio output devices 255 to guests onboard the vehicle 230. As another example, in the end user-controlled model, during presentation of a live video of a glacier on a video display 255, a user may request (e.g., via an interface presented by the video display 255 or another device)

different angles or a closer view of the glacier, in which case, the SCC 245 and/or the SMO 240 may dispatch UAV(s) 246 to capture images of the glacier according to the request. In one example, the user may request that one or more UAV(s) 246 collect physical samples off-board. For instance, the user may be engaged in a course involving soil quality in a mountain region, and may request that the UAV(s) 246 collect one or more samples of soil at the base of the mountain. The user's commentary on the quality/make-up of the collected soil samples may be inputted as add-on content to the course at the SCC 245 and/or the ODSC system 250. In any case, UAV-captured data may be shared with one or more users onboard the vehicle 230 (e.g., by way of their respective user devices 255) or to other users external to the vehicle 230 (e.g., by way of a web server). Example functionalities/use cases relating to such UAV deployment are shown by reference numbers 271-276. As shown by reference number 271, user(s) onboard the vehicle 230 may (e.g., using their corresponding user devices 255) submit requests to utilize UAV(s) to capture data of surrounding areas, including any requirements, such as target object(s), desired views, desired angles, desired proximity, etc. As shown by reference number 272, the SCC 245 (and/or the SMO 240) may control or dispatch UAV(s) to capture the requested data. As shown by reference number 273, the UAV(s) may provide captured data to the SCC 245 (and/or the SMO 240), which can subsequently present (274) the captured data to the users. Presentation can be in the form of a multicast to multiple user devices 255, a broadcast, or on-demand based on user retrieval requests. As shown by reference number 275, the user(s) may share and/or comment on the data with others onboard the vehicle 230 or elsewhere. This may involve social networking or sharing/commenting regarding the collected data, including, for instance, off-board social networking or sharing/commenting (such as with family members or friends of guests onboard).

In some embodiments, the SCC 245 may be configured to control or dispatch UAV(s) 246 to interact with entities elsewhere. For instance, where the vehicle 230 is located on water near land, the SCC 245 may dispatch UAV(s) 246 per user request to scout or otherwise engage with stores, restaurants, or other areas on land or individuals associated therewith. As an example, a popular chef at a nearby restaurant may make their presence and culinary knowledge available for viewing by those onboard the vehicle 230 who wish to remain onboard. In this example, the SCC 245 may, based upon user request, dispatch UAV(s) 246 to capture video/audio of the chef and/or establish interactive communications between the chef and user(s) onboard (e.g., video conferencing between the chef and the user(s)). The SCC 245 may interact with one or more terrestrial or local controllers to facilitate the communications as needed. For instance, the chef may submit an instruction or program the local controller to broadcast signals that indicate whether the chef permits permit UAV(s) 246 to be present at their restaurant. The SCC 245 and/or the UAV(s) 246 may monitor for and receive communications from the local controller to determine whether such permission is granted. Where the communications indicate the chef's permission, the SCC 245 may control the UAV(s) 246 to be in or to remain in the area to capture the video/audio. In this way, passengers may experience one or more off-board activities while remaining onboard the vehicle 230.

By facilitating various of the actions described above, the SCC 245 and/or the SMO 240 may even provide live feed(s) to enable real-time (or near real-time) off-board virtual cruise experiences for those who are not onboard the vehicle

230. For instance, family members of guests onboard, or simply individuals who would like to vicariously enjoy the cruise, can consume the live feed(s), just as if they were part of the cruise. Multiple cruise ships providing their respective live feeds can be packaged as a subscription-based offering (e.g., where viewers can "switch" channels as desired to view live feeds of different cruise content), which can provide additional revenue streams to cruise operators.

FIG. 2B is a block diagram illustrating an example, non-limiting embodiment of a network architecture of a task-based system functioning within, or operatively overlaid upon, the communications network 100 of FIG. 1 and/or the system of FIG. 2A, in accordance with various aspects described herein. As shown in FIG. 2B, the network system may be related to the vehicle 230, and may include the SCC 245, a smart remote controller (SRC) 280s, and IoT devices (e.g., cleaning bots) 280i. Although not shown, one or more networks may be present to facilitate communications between the various systems/devices. For instance, the IoT devices 280i may be communicatively coupled to the SCC 245 and/or the SRC 280s by way of an access network (e.g., wireless RAN(s), Wi-Fi network(s), Bluetooth network(s), and/or the like). In certain embodiments, the task-based system may leverage 5G, 6G, or a higher generated RAT and/or advanced wireless communication technologies, such as Wi-Fi 7 or a higher generation technology. Employing such technologies provides for high-speed, low-latency connectivity for the cleaning bots 280i, the SCC 245, and the SRC 280s.

In various embodiments, the SRC 280s may be implemented in one or more computing devices/servers that are associated with a room or an area of the vehicle 230. Thus, there may be multiple SRC 280s located throughout the vehicle 230, some or all of which may be communicatively coupled to the SCC 245. In one or more embodiments, the SRC 280s may be configured to communicate (e.g., wirelessly) with IoT devices 280i to facilitate various maintenance/cleaning actions. IoT devices 280i may be or may include a communication device (e.g., a router, a modem, a mobile phone, or a wearable device, such as a smart wristwatch, a pair of smart eyeglasses, media-related gear (e.g., augmented reality (AR), virtual reality (VR), or mixed reality (MR) glasses and/or headset/headphones)), an electrical switch controller, a security camera, an automated assistant, a smart TV, an environmental sensor/controller (e.g., for lighting, temperature, audio, etc.), a kitchen/bath appliance controller (e.g., for a stove, a dehumidifier, etc.), a drapery (e.g., curtain, shade, blinds, or the like) controller, a location device, a vehicle, a similar type of device, a different type of device, or a combination of some or all of these devices. In certain embodiments, the IoT devices 280i may be robots or cleaning bots that are configured with moveable/modular/interchangeable components (e.g., limbs, such as arms, legs, etc.) adapted to perform maintenance and/or cleaning of rooms or areas of the vehicle 230. In these embodiments, the cleaning bots 280i may be equipped with various sensors for detecting the condition of a room/area. For instance, the cleaning bots 280i may include camera(s), microphone(s), temperature sensor(s), humidity sensor(s), and/or the like for capturing images and audio in a room/area, the temperature of the room/area, the humidity level in the room/area, etc.

In exemplary embodiments, the SCC 245 and/or an individual SRC 280s may be capable of managing the IoT devices 280i, analyzing the conditions of room(s)/area(s), and assigning maintenance/cleaning tasks to the IoT devices 280i. In some embodiments, the SCC 245 and/or an individual SRC 280s may analyze data captured by sensors of IoT devices 280i to learn about maintenance/cleaning of rooms/areas (e.g., how effective the cleaning bots are at performing various cleaning tasks) and adjust maintenance/cleaning instructions and/or models to optimize or improve the process over time. In this way, the SCC 245, the SRC 280s, and/or IoT devices 280i may form an integrated system that provides for dynamic condition detection, task-based learning, and maintenance/cleaning.

Referring now to an example flow of smart maintenance/cleaning on the cruise ship 230 shown in FIG. 2B, at 281, the IoT device 280i may perform an inspection of a room or area of the vehicle 230, and may report information regarding the inspection to the SRC 280s. In various embodiments, the inspection may involve utilizing one or more sensors to capture data regarding conditions of the room or area. For instance, the IoT device 280i may utilize one or more image sensors to capture image data of various objects in a room, such as bed sheets, blankets, the toilet seat, the bathroom floor, the toilet paper roll, the sink, the mirrors, the tissue box, the carpet, etc., to help determine whether these objects need refilling/replacement or are soiled (e.g., have determined levels of dirtiness or wetness that are beyond a threshold) and thus whether certain levels of cleaning or certain cleaning equipment are needed. As another example, the IoT device 280i may utilize one or more audio sensors to capture audio data of a room to help determine whether external sound (e.g., from the sea) is penetrating into the room and thus whether sound barriers, such as windows or frames, need repair. As yet another example, the IoT device 280i may utilize one or more humidity sensors to capture humidity data in a room to help determine whether the humidity exceeds a threshold, and thus whether a dehumidifier is required for the room. In one or more embodiments, the IoT device 280i may determine the conditions based on collected sensor data, and may report the determined conditions of the room or area to the SRC 280s. In other embodiments, the IoT device 280i may simply pass the collected sensor data to the SRC 280s, in which case the SRC 280s may analyze the data to determine the conditions of the room or area.

At 282, the SRC 280s may inform the SCC 245 regarding the conditions of the room or area and/or any tasks that need to be performed for the room or area and, at 283, the SCC 245 may assign and/or coordinate resources (e.g., additional IoT devices, human staff, etc.) to tend to the room or area accordingly. For instance, the SCC 245 may, based on a determination that the bedsheets in a room are sufficiently soiled (e.g., covered with dirt or discolored beyond a threshold), assign an IoT device 280i to obtain a clean bedsheet and replace the soiled bedsheet in the room. As another example, the SCC 245 may, based on a determination that the toilet paper roll in the bathroom of a room is running low (e.g., has fewer than a threshold number of sheets), assign an IoT device 280i to obtain a new toilet paper roll and replace the one in the bathroom. As yet another example, the SCC 245 may, based on a determination that the humidity level in a room is higher than a threshold, assign an IoT device 280i to transport a dehumidifier device to the room to dehumidify the room. In one or more embodiments, the SCC 245 may assign a combination of human staff member(s) and IoT device(s) 280i to tend to one or more tasks that are to be performed for a room or area. For instance, to conserve time or to accommodate scheduling of work hours for human staff members, the SCC 245 may assign a human staff member to tend to any repairs that may be necessary to a damaged mirror in a room, and may assign an IoT device 280i to refill an empty tissue box in the room.

In various embodiments, the task-based system may be adaptive to the location or changing conditions. For instance, the task-based system may adjust or reprogram maintenance/cleaning protocols of cleaning bots based on environmental conditions, regulations, rules, and/or customs associated with a current location of the vehicle 230. To illustrate an example flow of this feature, at 291 of FIG. 2B, the SCC 245 may obtain information regarding the current location of the vehicle 230 (e.g., based on sensor data, communications with regional/local systems, etc.), and at 292, the SCC 245 may instruct and/or reprogram IoT devices 280i according to the information. This may involve customizing rooms to adapt to different countries/cities. In one or more embodiments, the IoT devices 280i may be equipped with modular components and/or interchangeable parts that can be used to quickly and easily change the appearance and functionality of a (e.g., each) room. Based on information regarding the current location/port, such as any local customs, the SCC 245 may select appropriate components/parts to customize one or more rooms. As an example, in a case where the SCC 245 determines that the vehicle 230 has arrived at or is near (e.g., within a threshold distance from) a port in Japan, the SCC 245 may select Japanese-style furnishings and decor for the rooms, and task one or more IoT devices 280i to style the rooms accordingly. As another example, in a case where the SCC 245 determines that the vehicle 230 has arrived at or is near (e.g., within a threshold distance from) a port in Italy, the SCC 245 may select Italian-style furnishings and decor for the rooms, and task one or more IoT devices 280i to style the rooms accordingly. As a further example, in a case where the SCC 245 determines that it is customary at the current location to have certain types or lighting or levels of lighting, the SCC 245 may task one or more IoT devices 280i to change the lighting or adjust the levels of lighting for some or all of the rooms. In addition to customizing the appearance of rooms, the SCC 245 may also be capable of programming or configuring IoT devices 280i to provide specific services and amenities to guests, such as delivering room service items. Information regarding the current location, local customs, rules, etc. can be used to adapt the such services and amenities. In certain embodiments, customizations based on environmental conditions, regulations, rules, and/or customs may be subject to guest approval. In some embodiments, customizations based on environmental conditions and/or local customs may be subject to guest approval, but customizations based on local regulations/rules may or may not be subject to guest approval. For instance, in a case where a locality promotes or requires reduced plastic usage/waste, the SCC 245 may task IoT devices 280i to fill mini fridges with smaller spring water bottles rather than larger ones. In this example, the SCC 245 may or may not acknowledge guest requests for larger spring water bottles.

It is to be understood and appreciated that, although one or more of FIGS. 1, 2A, and 2B might be described above as pertaining to various processes and/or actions that are performed in a particular order, some of these processes and/or actions may occur in different orders and/or concurrently with other processes and/or actions from what is depicted and described above. Moreover, not all of these processes and/or actions may be required to implement the systems and/or methods described herein. Furthermore, while various systems, controllers, devices, vehicles, etc. may have been illustrated in one or more of FIGS. 1, 2A, and 2B as separate systems, controllers, devices, vehicles, etc., it will be appreciated that multiple systems, controllers, devices, vehicles, etc. can be implemented as a single system, controller, device, vehicle, etc., or a single system, controller, device, vehicle, etc. can be implemented as multiple systems, controllers, devices, vehicles, etc. Additionally, functions described as being performed by one system, controller, device, vehicle, etc. may be performed by multiple systems, controllers, devices, vehicles, etc., or functions described as being performed by multiple systems, controllers, devices, vehicles, etc. may be performed by a single system, controller, device, vehicle, etc.

FIG. 2C depicts an illustrative embodiment of a method 295 in accordance with various aspects described herein.

At 295a, the method can include receiving a user selection relating to a course. For example, the ODSC system 250 can, similar to that described above with respect to the system of FIG. 2A, perform one or more operations that include receiving a user selection relating to a course.

At 295b, the method can include transmitting a request to a controller in a vehicle for information regarding capabilities of available devices onboard the vehicle, wherein the available devices include uncrewed aerial vehicles (UAVs). For example, the ODSC system 250 can, similar to that described above with respect to the system of FIG. 2A, perform one or more operations that include transmitting a request to the SCC 245 in a vehicle for information regarding capabilities of available devices onboard the vehicle, wherein the available devices include uncrewed aerial vehicles (UAVs).

At 295c, the method can include based on the transmitting, obtaining, from the controller, the information regarding the capabilities. For example, the ODSC system 250 can, similar to that described above with respect to the system of FIG. 2A, perform one or more operations that include based on the transmitting, obtaining, from the SCC 245, the information regarding the capabilities.

At 295d, the method can include responsive to the obtaining, sending a command to the controller to facilitate deployment of one or more of the UAVs to collect data for the course. For example, the ODSC system 250 can, similar to that described above with respect to the system of FIG. 2A, perform one or more operations that include responsive to the obtaining, sending a command to the SCC 245 to facilitate deployment of one or more of the UAVs to collect data for the course.

At 295e, the method can include after the sending, receiving the data from the controller and incorporating the data into the course for delivery to one or more users onboard the vehicle. For example, the ODSC system 250 can, similar to that described above with respect to the system of FIG. 2A, perform one or more operations that include after the sending, receiving the data from the SCC 245 and incorporating the data into the course for delivery to one or more users onboard the vehicle.

While for purposes of simplicity of explanation, the respective processes are shown and described as a series of blocks in FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 2D:
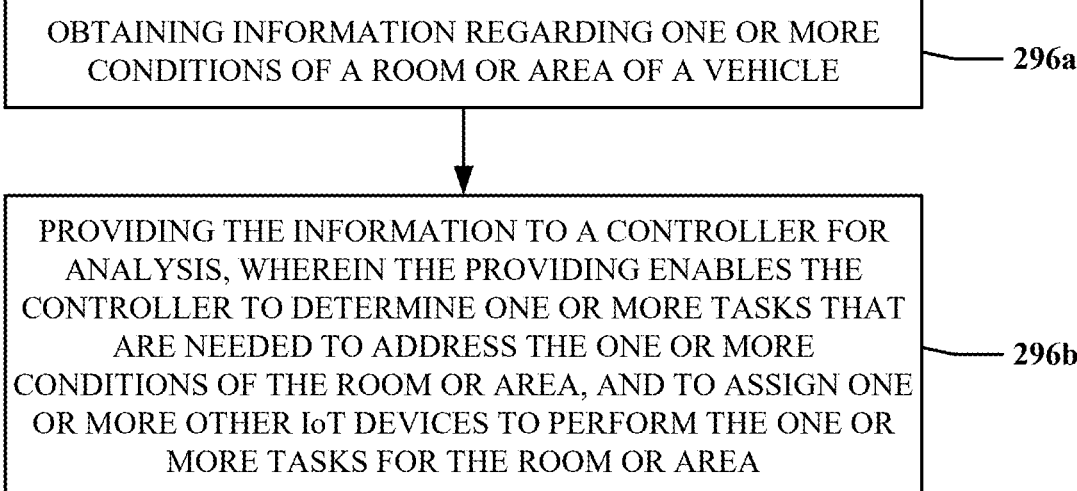
FIG. 2D depicts an illustrative embodiment of a method in accordance with various aspects described herein.

FIG. 2D depicts an illustrative embodiment of a method 296 in accordance with various aspects described herein.

At 296a, the method can include obtaining information regarding one or more conditions of a room or area of a vehicle. For example, the IoT device 280i can, similar to that described above with respect to the system of FIG. 2B, perform one or more operations that include obtaining information regarding one or more conditions of a room or area of a vehicle.

At 296b, the method can include providing the information to a controller for analysis, wherein the providing enables the controller to determine one or more tasks that are needed to address the one or more conditions of the room or area, and to assign one or more other IoT devices to perform the one or more tasks for the room or area. For example, the IoT device 280i can, similar to that described above with respect to the system of FIG. 2B, perform one or more operations that include providing the information to an SRC 280s and/or an SCC 245 for analysis, wherein the providing enables the SRC 280s and/or the SCC 245 to determine one or more tasks that are needed to address the one or more conditions of the room or area, and to assign one or more IoT devices to perform the one or more tasks for the room or area.

While for purposes of simplicity of explanation, the respective processes are shown and described as a series of blocks in FIG. 2D, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
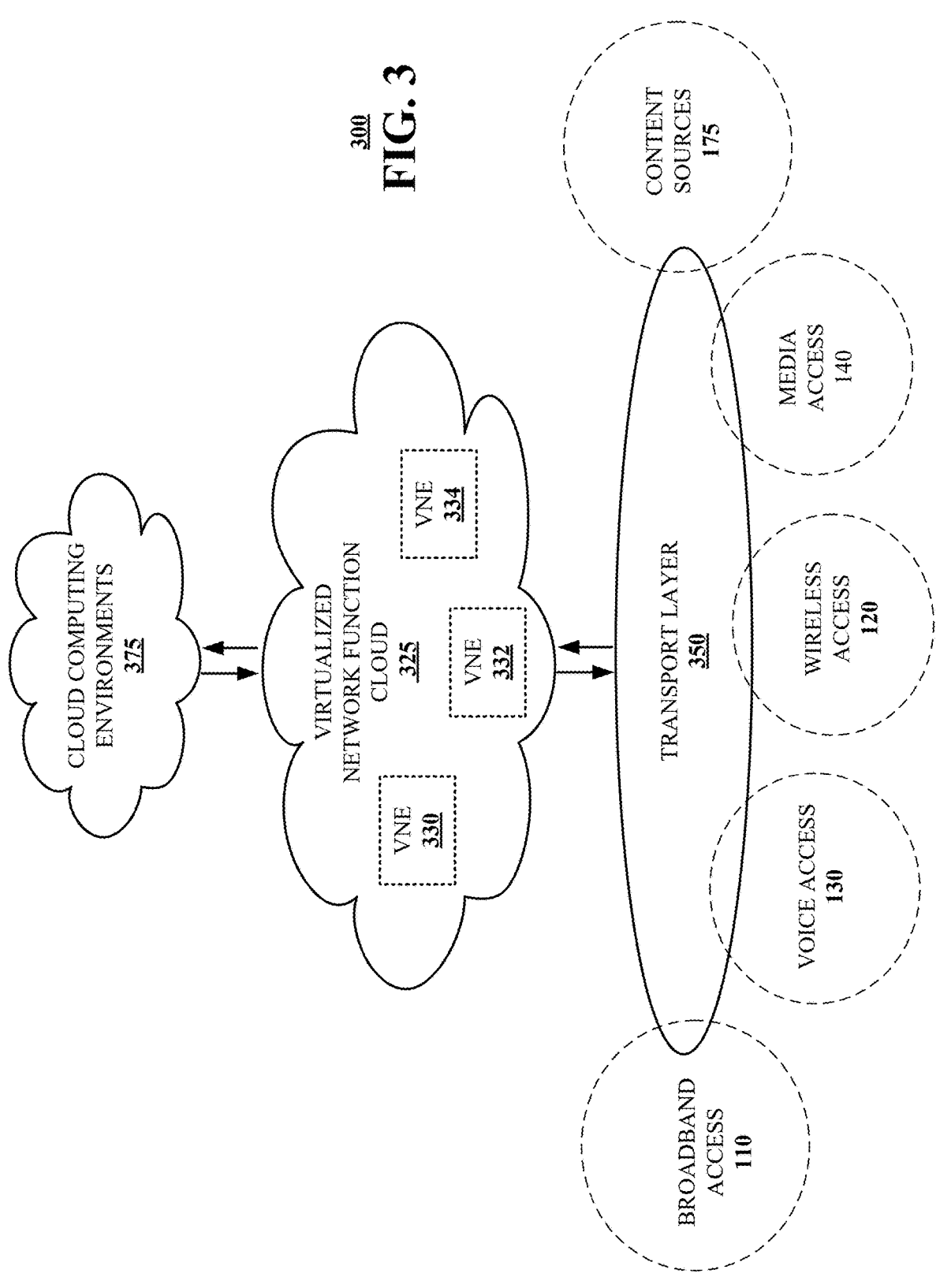
FIG. 3 is a block diagram illustrating an example, non-limiting embodiment of a virtualized communications network in accordance with various aspects described herein.

Referring now to FIG. 3, a block diagram 300 is shown illustrating an example, non-limiting embodiment of a virtualized communications network in accordance with various aspects described herein. In particular, a virtualized communications network is presented that can be used to implement some or all of the subsystems and functions of system 100 and the subsystems and functions of the systems and the methods presented in FIGS. 1, 2A, and 2B. For example, virtualized communications network 300 can facilitate, in whole or in part, real-time (or near real-time) enhanced learning services and/or intelligent on-demand task-based services.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communications network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
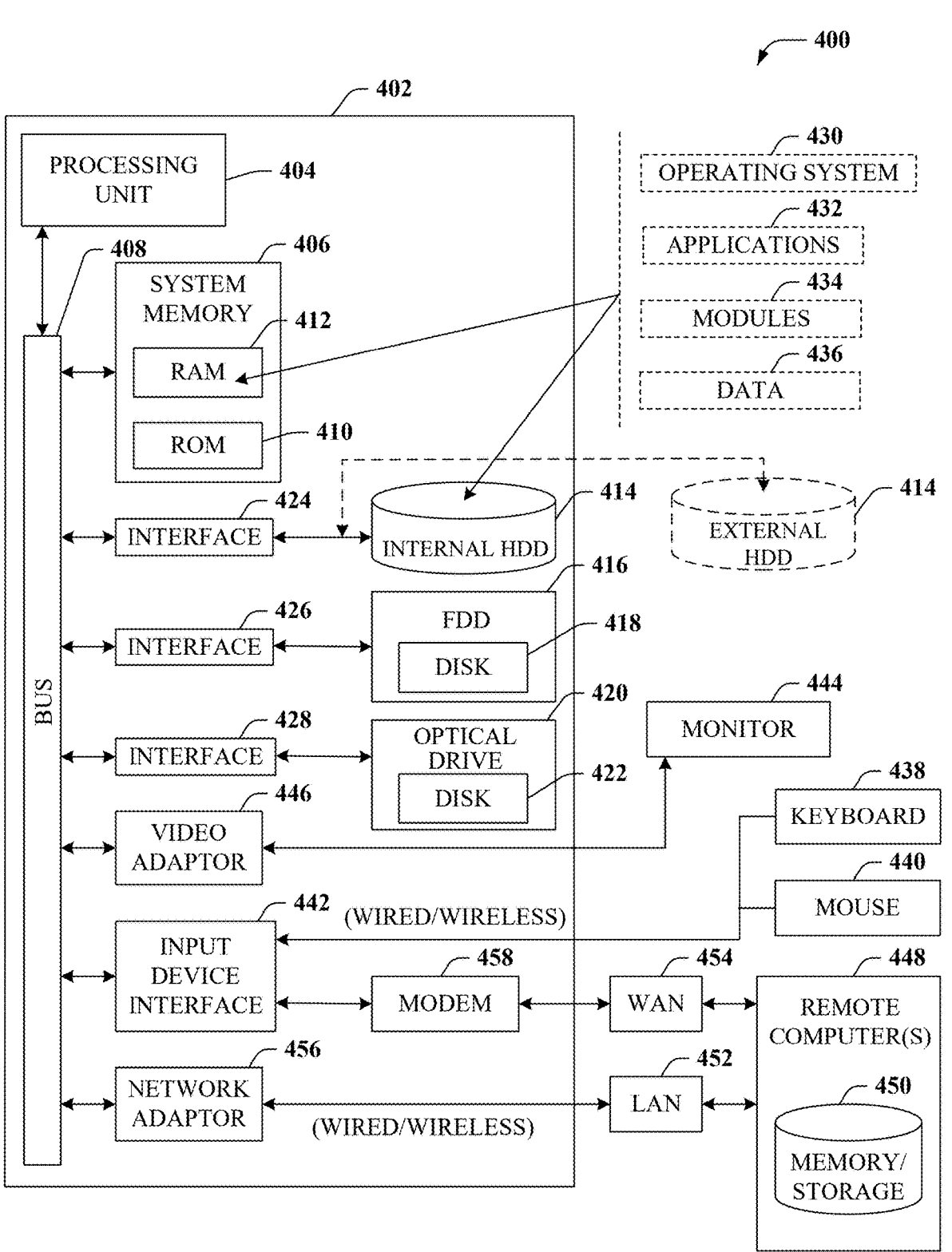
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate, in whole or in part, real-time (or near real-time) enhanced learning services and/or intelligent on-demand task-based services.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communications network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
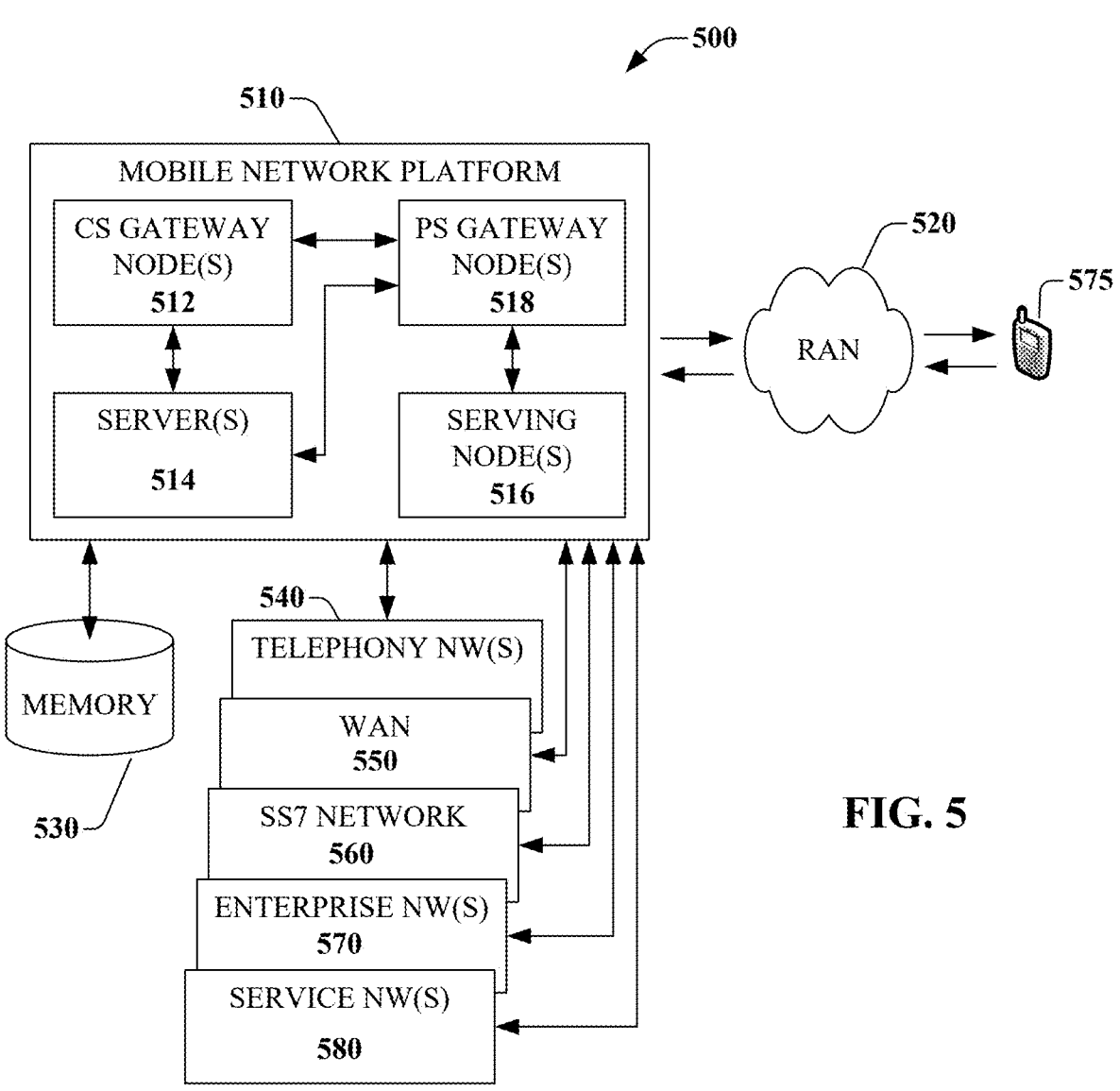
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate, in whole or in part, real-time (or near real-time) enhanced learning services and/or intelligent on-demand task-based services. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s)

512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as distributed antenna networks that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
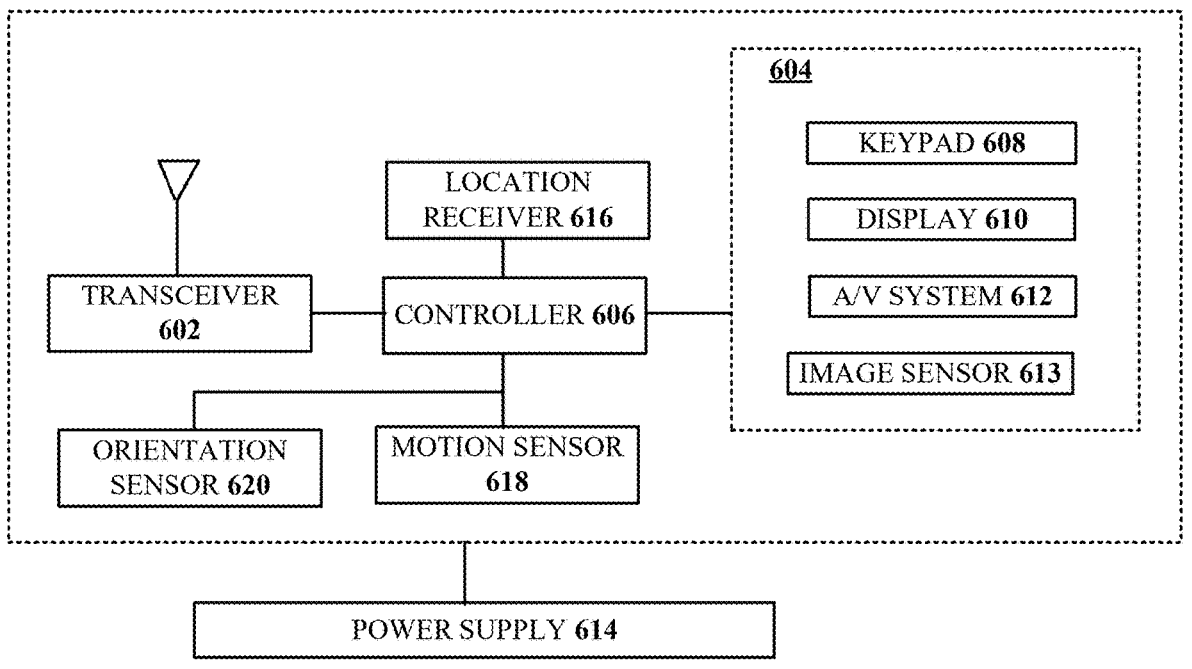
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via communications network 125. For example, computing device 600 can facilitate, in whole or in part, real-time (or near real-time) enhanced learning services and/or intelligent on-demand task-based services.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

In various embodiments, threshold(s) may be utilized as part of determining/identifying one or more actions to be taken or engaged. The threshold(s) may be adaptive based on an occurrence of one or more events or satisfaction of one or more conditions (or, analogously, in an absence of an occurrence of one or more events or in an absence of satisfaction of one or more conditions).

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, non-volatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communications network) can employ various AI-based schemes for conducting various embodiments thereof. Moreover, the classifier can be employed to determine a ranking or priority of each cell site of the acquired network. A classifier is a function that maps an input attribute vector, $x=(x1, x2, x3, x4, \ldots, xn)$, to a confidence that the input belongs to a class, that is, $f(x) =$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized. It is also to be understood and appreciated that the subject matter in one or more dependent claims may be combined with that in one or more other dependent claims.

What is claimed is:

1. A device, comprising:

a processing system including a processor; and a memory that stores executable instructions that, when executed by the processing system, facilitate performance of operations, the operations comprising:

receiving a user selection relating to a course;

transmitting a request to a controller in a vehicle for information regarding:

capabilities of available devices onboard the vehicle, wherein the available devices include uncrewed aerial vehicles (UAVs);

based on the transmitting, obtaining, from the controller, the information regarding the capabilities;

responsive to the obtaining, deploying one or more UAVs and collecting, with the one or more UAVs, data for the course; and receiving the data from the controller and incorporating the data into the course for delivery to one or more users onboard the vehicle.

2. The device of claim 1, wherein the vehicle comprises a cruise ship, a spaceship, a train, or a bus.

3. The device of claim 1, wherein the operations further comprise communicating, via the controller, with a service management and orchestration system (SMO) to coordinate network connectivity for the one or more UAVs.

4. The device of claim 1, wherein the course is included in a catalog of courses available for study.

5. The device of claim 1, wherein the operations further comprise facilitating delivery of the course to one or more users that are not onboard the vehicle.

6. The device of claim 1, wherein the data for the course comprises video data, image data, audio data, or a combination thereof.

7. The device of claim 1, wherein the data for the course comprises physical samples.

8. The device of claim 1, wherein the user selection is received from a user device that is distinct from the controller.

9. The device of claim 1, wherein the available devices include one or more video output devices, one or more audio output devices, or a combination thereof.

10. The device of claim 9, wherein the delivery of the course involves utilization of the one or more video output devices, the one or more audio output devices, or the combination thereof.

11. A non-transitory machine-readable medium, comprising executable instructions that, when executed by a processing system of a vehicle including a processor, facilitate performance of operations, the operations comprising:

receiving, from a learning system, a request for information regarding:

capabilities of available devices onboard the vehicle, wherein the request relates to a course, and wherein the available devices include uncrewed aerial vehicles (UAVs);

based on the request, transmitting, to the learning system, the information regarding the capabilities;

responsive to the transmitting, receiving, from the learning system, a command to deploy one or more UAVs to collect data for the course;

based on the command, causing deploying the one or more UA Vs and collecting, with the one or more UAVs, the data for the course; and receiving the collected data by the one or more UAVs and sending the collected data to the learning system for assembling, editing, and providing the collected data into the course for delivery to a user device onboard the vehicle.

12. The non-transitory machine-readable medium of claim 11, wherein the operations further comprise sending the data to the learning system for incorporation into the course.

13. The non-transitory machine-readable medium of claim 11, wherein the deploying the one or more UAVs further comprises communicating with a service management and orchestration system (SMO) to coordinate network connectivity for the one or more UAVs.

14. The non-transitory machine-readable medium of claim 11, wherein the collected data comprises video data, image data, audio data, or a combination thereof.

15. The non-transitory machine-readable medium of claim 11, wherein the course is selected by a user onboard the vehicle.

16. The non-transitory machine-readable medium of claim 11, wherein the available devices include one or more video output devices, one or more audio output devices, or a combination thereof.

17. A method, comprising:

receiving, by a processing system, from an Internet-of-Things (IoT) device including a processor, information regarding one or more conditions of a room or area of a vehicle; and analyzing, by the processing system, the information regarding the one or more conditions of the room or area of the vehicle, to determine one or more tasks that are needed to address the one or more conditions of the room or area, and to assign the IoT device or one or more other IoT devices to perform the one or more tasks for the room or area;

receiving, by the processing system, from a learning system, a request for information regarding:

capabilities of available devices onboard the vehicle, wherein the request relates to a course, and wherein the available devices include uncrewed aerial vehicles (UAVs);

based on the request, transmitting, by the processing system, to the learning system, the information regarding the capabilities;

responsive to the transmitting, receiving, by the processing system, from the learning system, a command to deploy one or more UAVs to collect data for the course;

based on the command, deploying, by the processing system, the one or more UAVs and collecting, by the processing system, with the one or more UAVs, the data for the course; and receiving, by the processing system, the collected data by the one or more UAVs and sending, by the processing system, the collected data to the learning system for assembling, editing, and providing the collected data into the course for delivery to a user device onboard the vehicle.

18. The method of claim 17, wherein the receiving involves use of one or more sensors to obtain sensor data.

19. The method of claim 18, wherein the one or more sensors comprise an image sensor, an audio sensor, an environmental sensor, or a combination thereof.

20. The method of claim 17, further comprising obtaining, by the processing system, data that includes environmental information, local custom information associated with a current location of the vehicle, or rules associated with the current location of the vehicle, and configuring the IoT device or the one or more other IoT devices to customize one or more rooms or areas of the vehicle based on the data.

* * * * *